(12) United States Patent
Atschreiter et al.

(10) Patent No.: US 10,655,734 B2
(45) Date of Patent: May 19, 2020

(54) DEVICE FOR SEALING A VALVE

(71) Applicant: Magna Powertrain GmbH & Co KG, Lannach (AT)

(72) Inventors: Friedrich Atschreiter, Allhartsberg (AT); Hannes Hofstetter, Waidhofen a.d. Thaya (AT); Michael Maurer, Ottensheim (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 15/509,964

(22) PCT Filed: Sep. 17, 2015

(86) PCT No.: PCT/EP2015/071369
§ 371 (c)(1),
(2) Date: Mar. 9, 2017

(87) PCT Pub. No.: WO2016/046064
PCT Pub. Date: Mar. 31, 2016

(65) Prior Publication Data
US 2017/0307084 A1    Oct. 26, 2017

(30) Foreign Application Priority Data

Sep. 25, 2014    (DE) .......................... 10 2014 219 460

(51) Int. Cl.
*F16K 5/16* (2006.01)
*F16J 15/02* (2006.01)
(Continued)

(52) U.S. Cl.
CPC .......... *F16J 15/025* (2013.01); *F16J 15/028* (2013.01); *F16J 15/3212* (2013.01);
(Continued)

(58) Field of Classification Search
CPC . F16K 3/20; F16K 3/207; F16K 3/243; F16K 5/0271; F16K 5/0471;
(Continued)

(56) References Cited

U.S. PATENT DOCUMENTS 3,497,177 A  *  2/1970  Hulsey .................. F16K 3/0227
                                                         251/172
3,848,938 A     11/1974  Stella et al.
(Continued)

FOREIGN PATENT DOCUMENTS

CH          174749 A  *  1/1935  ............. F16K 5/205
CN         2415210 Y      1/2001
(Continued)

OTHER PUBLICATIONS

International Search Report and Written Opinion dated Dec. 11, 2015 from International Patent Application No. PCT/EP2015/071369 (with English translation of International Search Report).
(Continued)

Primary Examiner — Hailey K. Do
(74) Attorney, Agent, or Firm — Dickinson Wright PLLC

(57) ABSTRACT

A device for sealing a valve for controlling a coolant of an internal combustion engine of a motor vehicle is described, which valve is mounted in a cooling system together with a valve housing, wherein the valve housing contains, at the inlet and/or the outlet side, a sealing ring which has an annular wall and a spaced annular lip extending away from the annular wall from a contact point.

16 Claims, 5 Drawing Sheets

(51) Int. Cl.
*F16J 15/3236* (2016.01)
*F16K 27/00* (2006.01)
*F16J 15/3212* (2016.01)
*F16J 15/48* (2006.01)

(52) U.S. Cl.
CPC ........... *F16J 15/3236* (2013.01); *F16J 15/48* (2013.01); *F16K 5/168* (2013.01); *F16K 27/00* (2013.01)

(58) Field of Classification Search
CPC ........ F16K 5/0689; F16K 5/168; F16K 5/188; F16K 5/161; F16K 5/181; F16K 5/201; F16K 5/205; F16K 5/208; F16K 3/10; F16K 3/16
See application file for complete search history.

(56) References Cited

U.S. PATENT DOCUMENTS

| | | | | |
|---|---|---|---|---|
| 4,061,307 A | * | 12/1977 | Yoshiike | ............... F16K 5/0673 251/174 |
| 4,084,608 A | * | 4/1978 | Laignel | ................. F16K 5/0673 137/246.22 |
| 4,258,901 A | | 3/1981 | Zinnai et al. | |
| 8,292,301 B1 | * | 10/2012 | Gilstad | ................. F04B 53/143 277/530 |
| 8,403,337 B1 | * | 3/2013 | Gilstad | ................... F04B 53/02 277/567 |
| 9,915,356 B2 | * | 3/2018 | Chang | .................... F16K 5/0464 |
| 2001/0013553 A1 | * | 8/2001 | Chamot | .................. F16K 31/04 236/12.11 |

FOREIGN PATENT DOCUMENTS

| | | | |
|---|---|---|---|
| CN | 201258970 Y | 6/2009 | |
| DE | 10219577 A1 | 12/2003 | |
| DE | 10329024 A1 | 1/2005 | |
| DE | 102009025341 A1 * | 12/2010 | ........... F16K 5/0663 |
| DE | 102013215971 A1 | 2/2015 | |
| EP | 2159459 A1 | 3/2010 | |
| EP | 2290274 A2 | 3/2011 | |
| WO | WO-2013172321 A1 * | 11/2013 | ................ F01P 7/16 |

OTHER PUBLICATIONS

Search Report dated Jan. 8, 2018 from corresponding ChinesePatent Application No. 2015800517862.

* cited by examiner

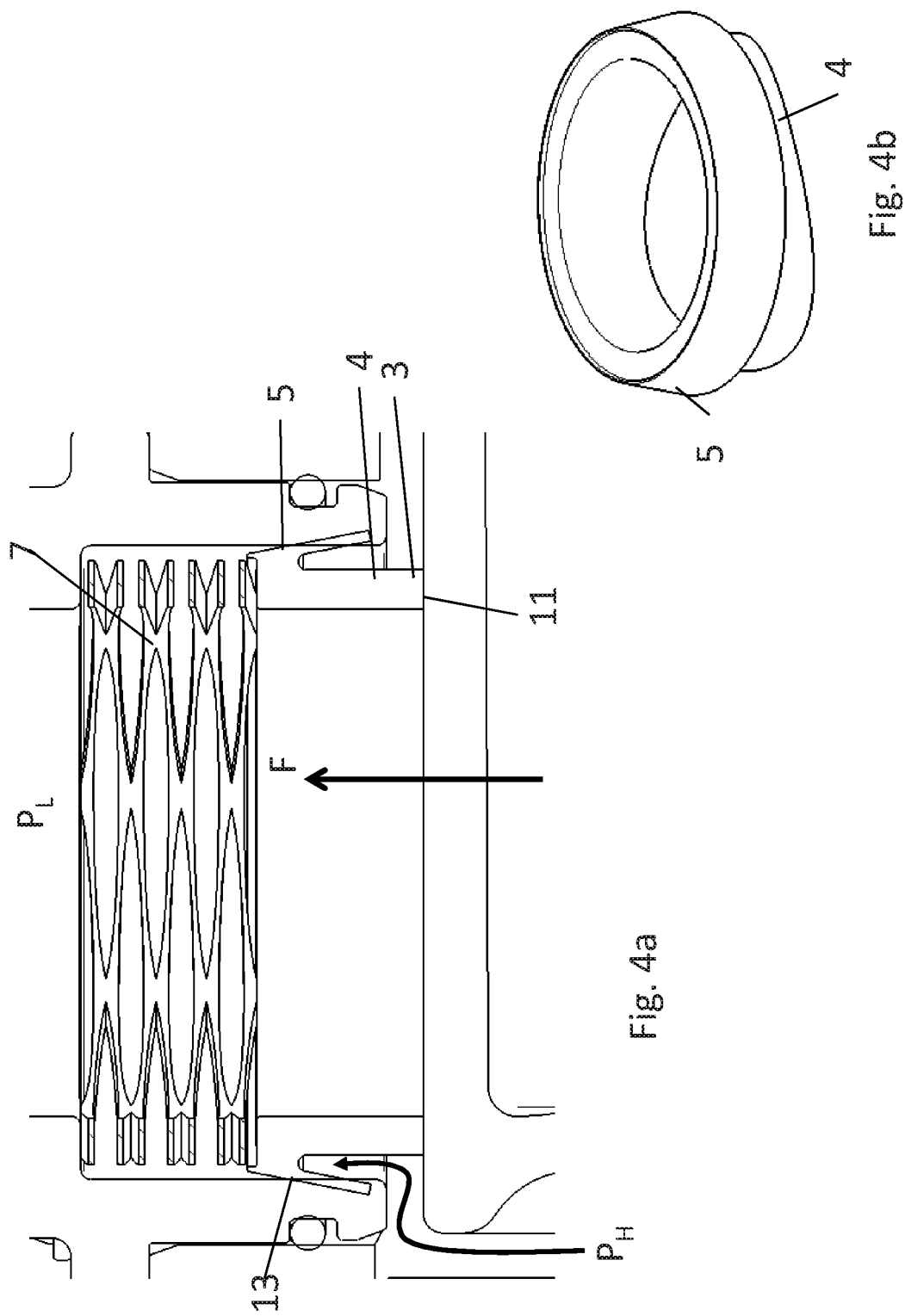

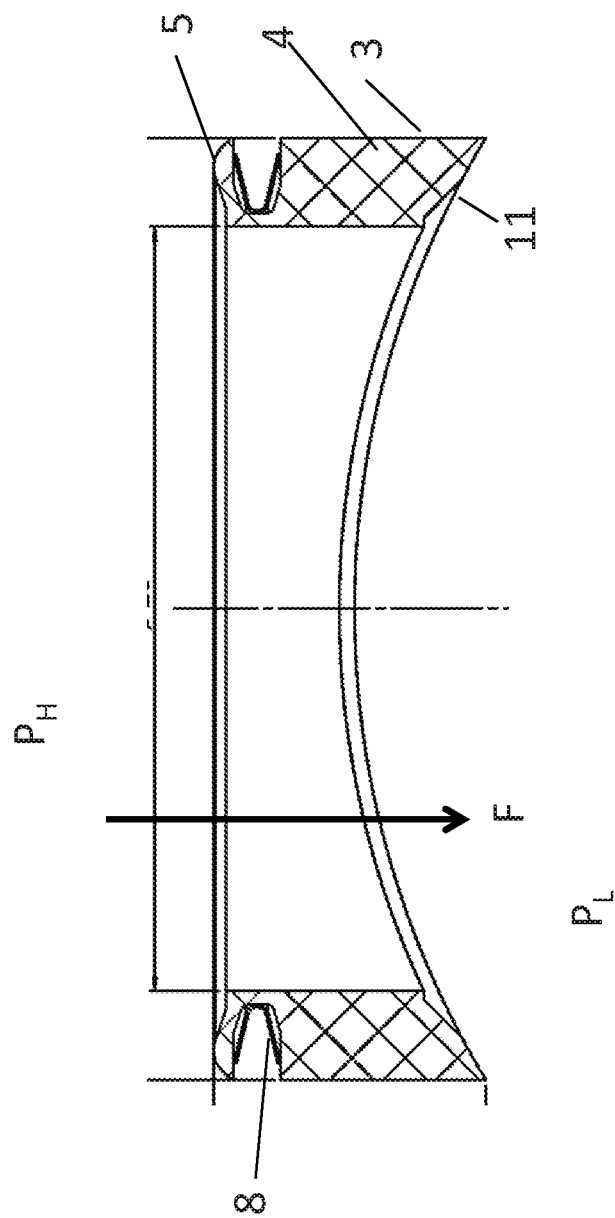

DEVICE FOR SEALING A VALVE

CROSS-REFERENCE TO RELATED APPLICATIONS

This application is a U.S. National Stage of International Application No. PCT/EP2015/071369 filed Sep. 17, 2015 and which claims the benefit and priority of German Application No. DE1020142019460.1 filed Sep. 25, 2014. The entire disclosure of each of the above applications is incorporated herein by reference.

FIELD

The present invention relates to a device for sealing a valve for use in a coolant flow of an internal combustion engine, for example of a motor vehicle, wherein the valve can be sealed with respect to the coolant flow.

BACKGROUND

This section provides information related to the present disclosure which is not necessarily prior art.

Valves of this type may be used to control the coolant flow of an internal combustion engine in order to ensure an optimal coolant temperature in the fluid circuit, depending on the loading condition. In the control system, it is important that the fluid-tightness of the individual control circuits be ensured.

Valves having a cylindrical valve body are frequently used in cooling systems, as, for example, in the unpublished DE 102013215971. The rotationally symmetrical valve body is mounted rotatably about the cylinder axis in a valve housing having inlet and outlet channels. Coolant is directed through openings in the outer region of the cylinder, the flow rate being regulated by rotation of the valve body. The channels cooperating with the openings in the outer region of the valve body are sealed by means of sealing sleeves which slide on the outer circumference of the cylinder. To ensure a sufficient sealing function, especially in a highly loaded position of the cylinder, correspondingly high contact pressure of the sleeve may be necessary.

In the configuration of the control circuits the sealing function is of major importance. The individual components are isolated from one another in a sealed manner. Sealing rings are used for this purpose. Such sealing rings may be used outlet and inlet of the circuit in a multi-way rotary valve.

However, an excessive pressure in partial regions of the coolant flow produced by very tight sealing systems is also undesirable.

SUMMARY

This section provides a general summary of the disclosure, and is not a comprehensive disclosure of its full scope or all of its features.

It is therefore the object of the invention to provide a device for sealing a valve in an improved form as compared to the known solutions.

This object is achieved by a valve having the features of claim 1. Developments of the invention are apparent from the dependent claims.

According to the invention a device for sealing a valve for controlling a coolant of an internal combustion engine of a motor vehicle is, which valve is mounted in a cooling system together with a valve housing, wherein the valve housing contains at the inlet and/or the outlet side a sealing ring which has an annular wall and an annular lip extending away from the annular wall and spaced therefrom.

As a result of the structure of the seal it is possible both to construct a pressure-assisted sealing system and to achieve a reduction of overpressure by means of the adjustable sealing system. A sealing system which can be used in a pressure-controlled manner is thereby achieved.

It is advantageous that the annular lip extends away from the annular wall at an acute angle. As a result, pressure can be exerted between the two sealing components, pressing the seal more strongly against the components to be sealed, or reducing overpressure in a different installed situation.

It is advantageous if the annular lip and the annular wall form a V-shaped or U-shaped structure in cross section.

Advantageously, the annular lip can be moved away from the annular wall when subjected to pressure in the direction of the contact point with the annular wall.

It is advantageous if the sealing ring is installed together with a spring, or if the sealing ring has an integrated spring body.

It is further advantageous that the combination of sealing ring and spring increases the contact pressure of the sealing ring or reduces to contact pressure of the sealing ring.

The contact face of the sealing ring is advantageously linear.

It is further advantageous that the contact face of the sealing ring is adapted to a cylindrical or spherical shape.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4 and 5 show embodiments of contact-pressure reducing sealing systems.

DETAILED DESCRIPTION

Example embodiments will now be described more fully with reference to the accompanying drawings.

Figure 1:
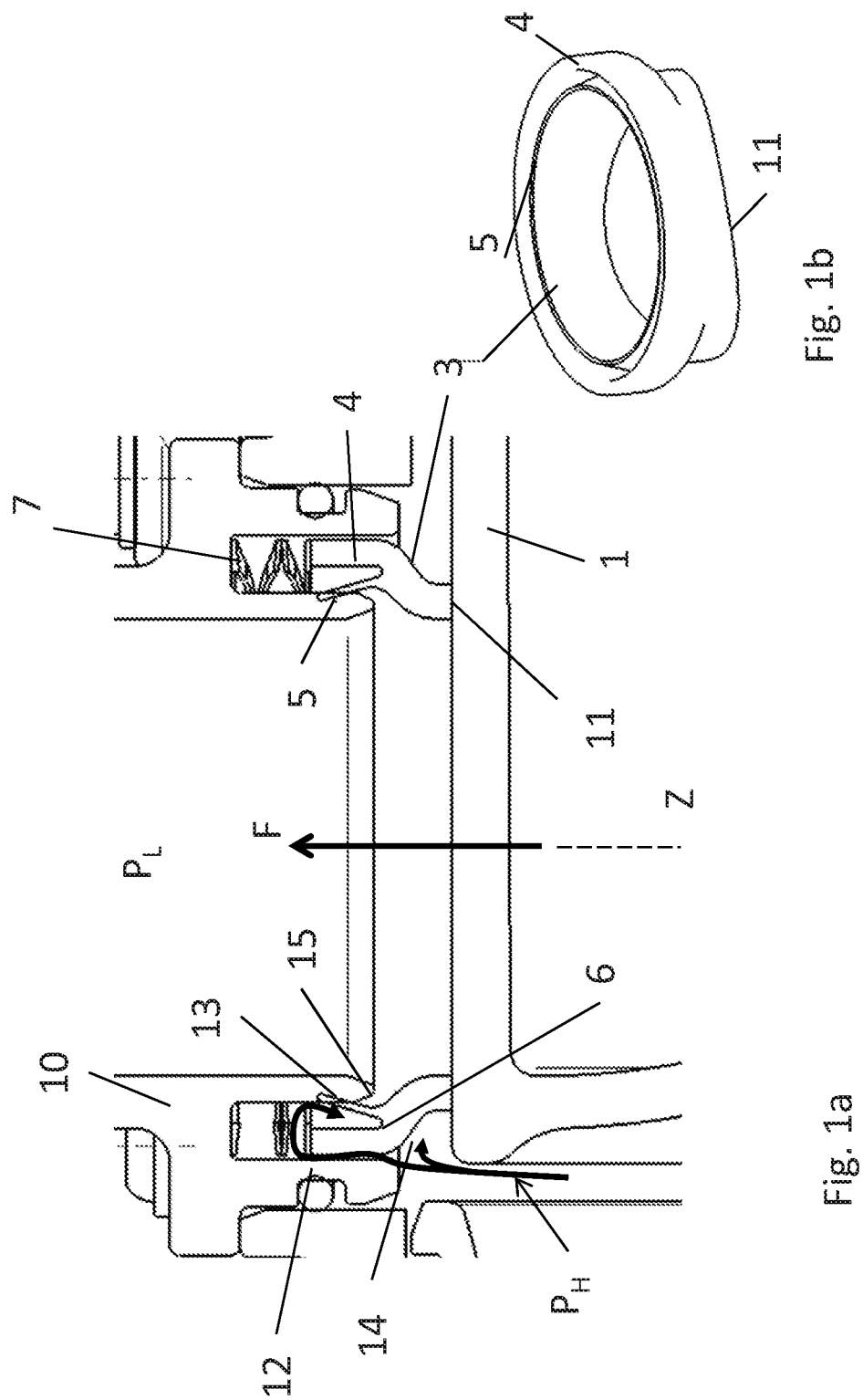
FIGS. 1 to 3 show embodiments of a pressure-assisted sealing system.

FIG. 1a shows a section through a portion of a cooling system. The cooling system 10 is shown here only in outline. The cooling system 10 must be sealed with respect to a valve housing 1. A sealing ring 3 is arranged between the cooling system 10 and the valve housing 1. The sealing ring 3 has a contact face 11 resting against the valve housing 1. On the side facing away from the valve housing 1 the sealing ring is configured with an annular wall 4 and with an annular lip 5 extending inwardly therefrom at an acute angle towards the cylinder axis Z. Starting from a contact point 6, the annular lip 5 offers a V-shaped groove with the annular wall 4.

In the exemplary embodiment, the radius of the sealing ring 3 in the region of the contact face 11 is smaller than the radius of the annular wall 4. The sealing ring 3 is in direct contact with a spring ring 7, which is arranged in a recess of the cooling system 10. The sealing ring 3 is preloaded with an axial force by means of the spring ring. In this exemplary arrangement the through-flow follows the arrow F. On the high-pressure side $P_H$ a channel 12 opens along the outside of the sealing ring 3, the high-pressure side of the system applying the pressure $P_H$ to the sealing ring as far as the V-shaped divergence of the sealing lip 5. This causes the annular lip to diverge further and to rest snugly against the contact face of the cooling system. In this context the region with a higher pressure in relation to the low-pressure side $P_L$ is referred to as the high-pressure side, which is intended merely to emphasize the pressure difference.

The radially diverging annular lip 5 is arranged such that, as a result of the differential pressure between $P_H$ and $R_L$, the annular lip is pressed more strongly against the adjacent face of the cooling system, and the whole sealing ring 3 is pressed more strongly against the valve housing 1 on account of the projected area.

As a result of the different internal radii, the sealing ring 3 forms a shoulder with an outer shoulder 14 and an inner shoulder 15. As shown in the drawing, the higher pressure $P_H$ is applied to the outer shoulder 14. This pressure component acts on the shoulder 14, pressing the inner shoulder 15 upward in the drawing toward the cooling system 10. With a suitable pressure, therefore, the inner shoulder 15 also bears against the cooling system and forms a seal in conjunction with the annular lip 5. This construction permits controlled management of the sealing function by means of the pressure difference between $P_H$ and $P_L$. The pressure difference acting on two different locations of the seal influences the sealing system and can be managed very effectively.

In this exemplary embodiment the contact face has a cylindrical configuration. As a result of the assistance by the pressure differential, the spring 7 can be designed with lower spring force. FIG. 1b shows a view of the sealing ring according to the invention.

Figure 2:
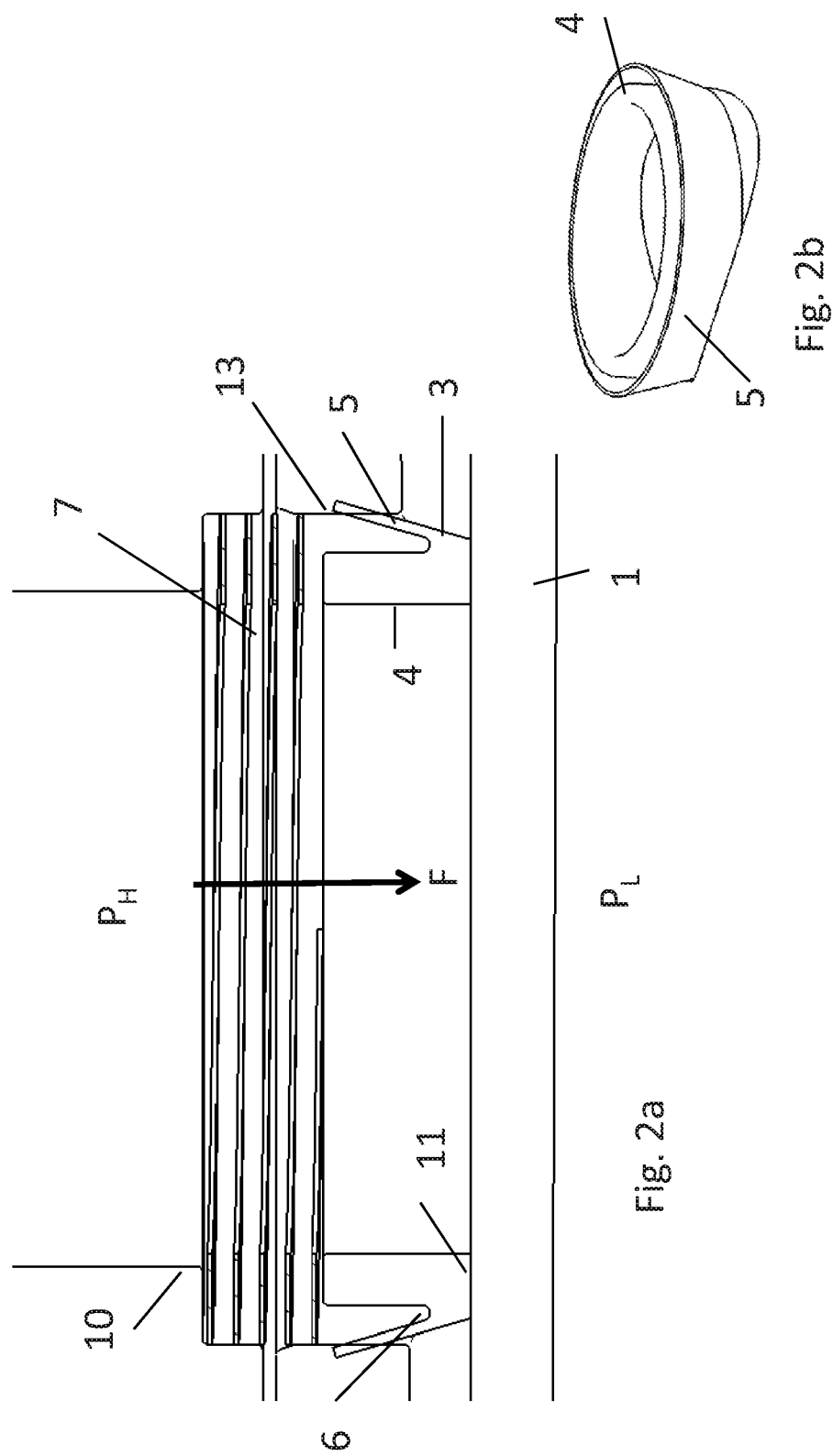

The embodiment of FIG. 2a and FIG. 2b show an alternative form. The sealing ring 3 is again located between a high-pressure region $P_H$ and a low-pressure region $P_L$. The sealing ring is preloaded by means of the spring 7. The sealing ring again has an annular wall 4 from which an annular lip 5, starting from the contact point 6, diverges. In this exemplary embodiment the sealing ring has the same radius in the region of the contact face 11 and in the region of the annular wall 4. However, the annular lip does not diverge toward the inside but toward the outside.

As a result of the pressure difference, the annular lip 5 is pressed against the adjacent sealing face 13 and the whole sealing ring is pressed more strongly against the contact face 11. In this case, too, the pressure difference assists the sealing function of the sealing ring.

Figure 3:
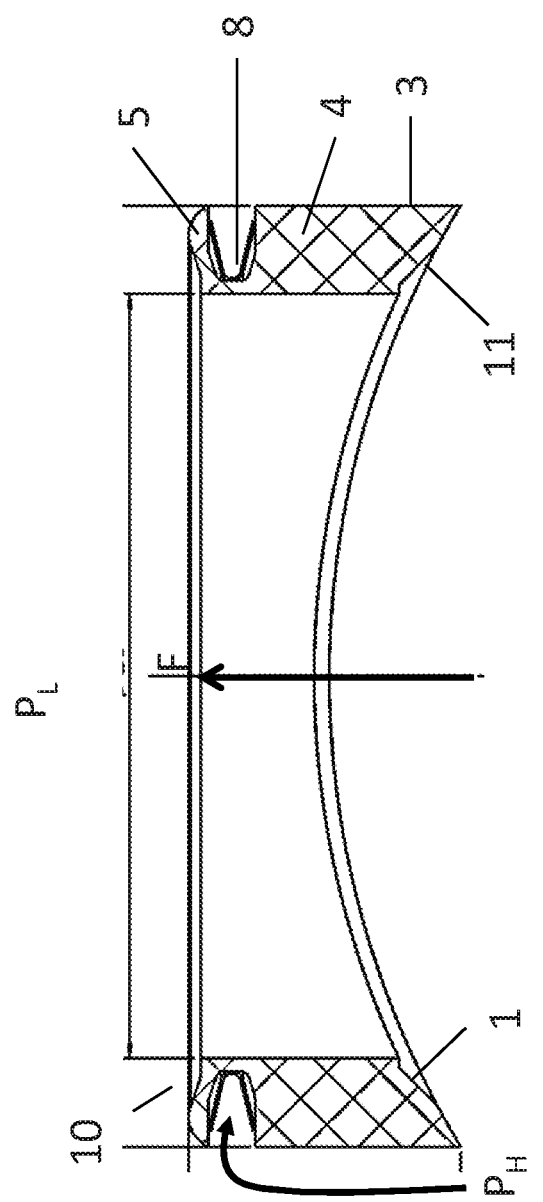

FIG. 3 shows an alternative embodiment. Here, the sealing ring also has a constant internal radius over its full extent. The annular wall 4 again has an annular lip 5, which in this example diverges from the wall via a U-shaped recess. In this embodiment the annular lip diverges in the axial direction and not in the radial direction.

In addition, the annular lip is preloaded axially by means of an internal spring 8. As a result of the axial preload, the annular lip 5 seals with respect to the cooling system 10, only indicated here, against the sealing face 13. The increased pressure $P_H$ is applied in the U-shaped gap between annular lip and annular wall, pressing the annular lip against the sealing face 13. The pressure assists the force generated by the internal spring 8 with respect to the cooling system 10, but also against the contact face 11 on the valve housing 1.

In this exemplary embodiment the contact face has a crowned configuration.

The arrangement according to FIG. 4a and FIG. 4b shows a sealing ring 3 which, pressed by a spring 7, is seated on a valve body 1 with a contact face 11. The sealing ring has a constant internal radius over its full extent. The annular lip 5 spaced from the annular transformation extends outward against the cooling system 10. The high pressure $P_H$ exerts increased pressure on the sealing ring in the region of the V-shaped divergence. This pressure acts against the spring force of the spring 7. As a result of the pressure on the high-pressure side, a portion of the spring force is compensated and the sealing ring 3 is pressed less strongly against the valve housing 1. Through appropriate design of the force of the spring body, therefore, an overpressure from the high-pressure side can be counteracted in the cooling system, since the sealing system dissipates the pressure via leakage as a result of the reduced contact pressure.

FIG. 5 shows an alternative embodiment in which the pressure difference is also used to regulate a specified leakage. The elevated pressure on the pressure side acts on the annular lip 5 so that the pressure works against the spring force of the internal spring 8. Here, too, the dimensioning of the spring and of the pressure system can allow a specified leakage to be achieved, whereby overpressure in the system is mitigated.

The embodiments illustrated are examples which can be supplemented with well-known modifications by the person skilled in the art. The variants encompass all possible forms of the contact faces, as well as the design of the sealing ring.

LIST OF REFERENCE NUMERALS

1 Valve housing
3 Sealing ring
4 Annular wall
5 Annular lip
6 Contact point
7 Spring
8 Internal spring
10 Cooling system
11 Contact surface
12 Channel
13 Sealing face
14 Outer shoulder
15 Inner shoulder

The invention claimed is:

1. A device for sealing a valve, comprising:
   a cooling system disposed about an axis and having an annular inside wall and an annular outside wall spaced radially outwardly from the annular inside wall and defining an annular recess radially between the annular inside and annular outside walls;
   a sealing ring positioned about the axis and having an annular wall partially received in the annular recess of the cooling system and partially extending outside of the annular recess and positioned adjacent to the annular outside wall of the cooling system, and having a spaced annular lip at least partially received in the annular recess and extending axially and tapering radially inwardly away from the annular wall to a contact point and engaging the annular inside wall;
   wherein the sealing ring is positioned at an inlet side and/or an outlet side of a valve housing;
   wherein the annular wall of the sealing ring generally has a tubular shape and extends axially from a distal end received in the annular recess to a contact face for sealingly engaging the valve housing; and the contact face of the annular wall positioned entirely radially inwardly of the distal end of the annular wall and defining an outer shoulder between the contact face and the distal end along a radial outer surface of the annular wall and defining an inner shoulder along a radially inner surface of the annular wall such that a pressure against the outer shoulder biases the inner shoulder against the annular inside wall of the cooling system to seal the annular wall against the cooling system.

2. The device for sealing a valve as claimed in claim 1, wherein the spaced annular lip extends away from the annular wall at an acute angle.

3. The device for sealing a valve as claimed in claim 1, wherein the spaced annular lip and the annular wall form a V-shaped or U-shaped structure in cross-section.

4. The device for sealing a valve as claimed in claim 1, further including a spring, and
wherein the sealing ring is installed together with the spring.

5. The device for sealing a valve as claimed in claim 1, wherein the contact face of the sealing ring has a cylindrical or spherical shape.

6. The device for sealing a valve as claimed in claim 1, wherein the annular wall defines the radially outermost portion of the sealing ring.

7. The device for sealing a valve as claimed in claim 1, further comprising a spring inside the annular recess of the cooling system and engaging the end of the annular wall opposite the contact face and configured to apply an axial biasing force thereto.

8. The device for sealing a valve as claimed in claim 1, wherein the sealing ring has regions with different internal radii, whereby the sealing ring forms a shoulder.

9. The device for sealing a valve as claimed in claim 8, wherein the sealing ring is elastically deformable as a result of pressure differences at the shoulder and on the spaced annular lip.

10. A device for sealing a valve comprising:
a cooling system disposed about an axis and having an annular inside wall and an annular outside wall spaced radially outwardly from the annular inside wall and defining an annular recess radially between the annular inside and annular outside walls;
a sealing ring positioned about the axis and having an annular wall at least partially received in the annular recess of the cooling system and positioned adjacent to the annular outside wall of the cooling system and including an annular lip at least partially received in the annular recess and extending axially and tapering radially inwardly away from the annular wall to a contact point and engaging the annular inside wall;
the annular wall of the sealing ring extending axially from a contact face for sealingly engaging a valve housing to a distal end in the annular recess of the cooling system; and
a spring positioned in the annular recess of the cooling system and biasing the distal end of the sealing ring toward the valve housing;
the contact face of the annular wall positioned entirely radially inwardly of the distal end of the annular wall and defining an outer shoulder between the contact face and the distal end along a radial outer surface of the annular wall and defining an inner shoulder along a radially inner surface of the annular wall such that a pressure against the outer shoulder biases the inner shoulder against the annular inside wall of the cooling system to seal the annular wall against the cooling system.

11. The sealing ring for a valve as claimed in claim 10, further including an annular channel radially between the annular wall and the annular lip for receiving a high-pressure fluid to bias the annular lip outwardly.

12. A device for sealing a valve comprising:
a cooling system disposed about an axis and having an annular inside wall and an annular outside wall spaced radially outwardly from the annular inside wall and defining an annular recess radially between the annular inside and outside walls;
a sealing ring having an annular wall extending axially between a distal end received in the annular recess of the cooling system and a contact face for axially engaging a valve housing;
the sealing ring further including an annular lip extending axially and radially inwardly from the annular wall from a contact point and radially engaging the annular inside wall of the cooling system inside the annular recess;
the sealing ring defining an annular channel between the annular wall and the sealing ring annular lip such that pressure within the annular channel biases the annular lip radially against the annular inside wall of the cooling system and biases the contact face axially against the valve housing;
the contact face of the annular wall positioned entirely radially inwardly of the distal end of the annular wall and defining an outer shoulder between the contact face and the distal end along a radial outer surface of the annular wall and defining an inner shoulder along a radially inner surface of the annular wall such that a pressure against the outer shoulder biases the inner shoulder against the annular inside wall of the cooling system to seal the annular wall against the cooling system.

13. The device for sealing a valve as set forth in claim 12 wherein at least a portion of the contact face of the sealing ring is positioned radially inwardly of the annular lip.

14. The device for sealing a valve as set forth in claim 12 further including a spring positioned inside the annular recess and axially biasing the sealing ring away from the cooling system.

15. The device for sealing a valve as set forth in claim 12 wherein the annular recess terminates axially at a spring supporting wall extending between the annular inside wall and the annular outside wall, and wherein the spring extends axially between the spring supporting wall and the distal end of the annular wall.

16. The device for sealing a valve as set forth in claim 12 wherein the annular wall is radially spaced from the annular outside wall of the cooling system at the distal end of the annular wall to allow fluids to pass between the annular wall and the annular outside wall of the cooling system.

* * * * *